(12) United States Patent
Cosman et al.

(10) Patent No.: US 8,106,128 B2
(45) Date of Patent: *Jan. 31, 2012

(54) PREFORMED COMPOSITIONS IN SHAPED FORM COMPRISING POLYMER BLENDS

(75) Inventors: Michael A. Cosman, Valencia, CA (US); Adrian K. Balladares, El Segundo, CA (US)

(73) Assignee: PRC DeSoto International, Inc., Sylmar, CA (US)

( * ) Notice: Subject to any disclaimer, the term of this patent is extended or adjusted under 35 U.S.C. 154(b) by 396 days.

This patent is subject to a terminal disclaimer.

(21) Appl. No.: 12/471,823

(22) Filed: May 26, 2009

(65) Prior Publication Data

US 2009/0223629 A1 Sep. 10, 2009

Related U.S. Application Data

(60) Division of application No. 10/935,857, filed on Sep. 8, 2004, now Pat. No. 7,553,908, which is a continuation-in-part of application No. 10/355,813, filed on Jan. 30, 2003, now Pat. No. 7,067,612, application No. 12/471,823, which is a continuation-in-part of application No. 10/837,337, filed on Apr. 30, 2004, now abandoned.

(51) Int. Cl.
*C08F 273/00* (2006.01)
*C08G 75/00* (2006.01)

(52) U.S. Cl. ............ 525/261; 525/263; 525/328.5; 525/330.9; 525/535; 528/373; 528/374; 528/378

(58) Field of Classification Search .......... 525/261, 525/263, 328.5, 330.9, 535; 528/373, 374, 528/378

See application file for complete search history.

(56) References Cited

U.S. PATENT DOCUMENTS

| 7,553,908 B1 * | 6/2009 | Cosman et al. ............ 525/261 |
| 2002/0007015 A1 | 1/2002 | DeMoss et al. |

FOREIGN PATENT DOCUMENTS

| RU | 2144553 C1 | 1/2000 |
| RU | 2207353 C2 | 6/2003 |
| SU | 239161 | 1/1970 |
| WO | WO 98/55795 | 12/1998 |

* cited by examiner

*Primary Examiner* — Duc Truong
(74) *Attorney, Agent, or Firm* — Diane R. Meyers

(57) ABSTRACT

Preformed compositions in shaped form comprising polymer blends, and the use of these preformed compositions in shaped form to seal apertures are disclosed. In certain embodiments, the preformed compositions are electrically conductive and are capable of shielding EMI/RFI radiation. The polymer blend includes a polysulfide component and a polythioether component.

20 Claims, No Drawings

US 8,106,128 B2

PREFORMED COMPOSITIONS IN SHAPED FORM COMPRISING POLYMER BLENDS

CROSS-REFERENCE TO RELATED APPLICATIONS

This application is a division of Ser. No. 10/935,857 filed Sep. 8, 2004 now U.S. Pat. No. 7,553,908, which is a continuation-in-part of Ser. No. 10/355,813, filed Jan. 30, 2003 now U.S. Pat. No. 7,067,612.

This application Ser. No. 12/471,823 filed May 26, 2009 is a CIP of Ser. No. 10/837,337 filed Apr. 30, 2004 now ABN.

FIELD OF THE INVENTION

The present invention relates to preformed compositions in shaped form and the use of preformed compositions for sealing apertures.

BACKGROUND OF THE INVENTION

Electromagnetic interference can be defined as undesired conducted or radiated electrical disturbances from an electrical or electronic source, including transients, that can interfere with the operation of other electrical or electronic apparatus. Such disturbances can occur at frequencies throughout the electromagnetic spectrum. Radio frequency interference ("RFI") is often used interchangeably with electromagnetic interference ("EMI"), although RFI more properly refers to the radio frequency portion of the electromagnetic spectrum usually defined as 10 kilohertz (KHz) to 100 gigahertz (GHz).

Electronic equipment is typically enclosed in a housing. The housing not only serves as a physical barrier to protect the equipment from the environment, but also can serve to shield EMI/RFI radiation. Enclosures having the ability to absorb and/or reflect EMI/RFI energy may be employed to confine the EMI/RFI energy within the source device, and to insulate the device or other external devices from other EMI/RFI sources. To maintain accessibility to the internal components, most enclosures are provided with openable or removable accesses such as doors, hatches, panels, or covers. Gaps typically exist between the accesses and the corresponding mating surfaces that reduce the efficiency of the electromagnetic shielding by presenting openings through which radiant energy may be emitted. Such gaps also present discontinuities in the surface and ground conductivity of the housing, and in some cases may generate a secondary source of EMI/RFI radiation by functioning as a slot antenna.

For filing gaps between the mating surfaces of the housing and removable accesses, gaskets and other seals are used to maintain electrical continuity across the structure, and to exclude environmental degradants such as particulates, moisture, and corrosive species. Such seals are bonded or mechanically attached to one or both of the mating surfaces and function to establish a continuous conductive path by conforming to surface irregularities under an applied pressure.

Conventional processes for manufacturing EMI/RFI shielding gaskets include extrusion, molding, and die-cutting. Molding involves the compression or injection molding of an uncured or thermoplastic resin into a certain configuration. Die-cutting involves the forming of a gasket from a cured polymeric material, which is cut or stamped into a certain configuration using a die. Form-in-place ("FIP") processes are also used for forming EMI/RFI shielding gaskets wherein the process involves the application of a bead of a viscous, curable, electrically-conductive composition in a fluent state to a surface that is subsequently cured-in-place by the application of heat, atmospheric moisture, or ultraviolet radiation to form an electrically-conductive, EMI/RFI shielding gasket.

Electrical conductivity and EMI/RFI shielding effectiveness is typically imparted to polymeric gaskets by incorporating conductive materials within the polymer matrix. The conductive elements can include metal or metal-plated particles, fabrics, meshes, and fibers. The metal can be in the form of, for example, filaments, particles, flakes, or spheres. Examples of metals include copper, nickel, silver, aluminum, tin, and steel. Other conductive materials that are used to impart EMI/RFI shielding effectiveness to polymer compositions include conductive particles or fibers comprising carbon or graphite. Conductive polymers such as polythiophenes, polypyrroles, polyaniline, poly(p-phenylene) vinylene, polyphenylene sulfide, polyphenylene, and polyacetylene may also be used.

In addition to shielding EMI/RFI radiation, in certain applications it is also desirable that the seal be transparent to incident broad spectrum radiation used for detection, location, or recognition purposes. For example, microwave radiation from 5-18 GHz, 35 GHz, 94 GHz, 140 GHz and 220 GHz has useful military significance. Electromagnetic radiation incident on a surface will be partly reflected and partly absorbed by the material and the sum of these effects determines the shielding effectiveness. The shielding effectiveness depends on several factors including the frequency of the electromagnetic radiation, the conductivity of the shielding material, the thickness and permeability of the shielding material, and the distance between the radiating source and the EMI/RFI shield. At high frequencies, above about 10 GHz, shielding effectiveness is primarily determined by the ability of the shielding material to absorb the incident radiation. Ferromagnetic particles with high permeability such as iron, carbonyl iron, cobalt metal alloys, and nickel metal alloys are used as radar absorbing materials.

In addition to providing continuous electrical conductivity and EMI/RFI shielding effectiveness, in certain applications it is desirable that gasket or seals to surfaces exposed to the environment, such as in aviation and aerospace vehicles, not lead to corrosion of the metal surfaces. When dissimilar metal and/or conductive composite materials are joined in the presence of an electrolyte, a galvanic potential is established at the interface between the dissimilar conductors. When the interfacial seal is exposed to the environment, particularly under severe environmental conditions such as salt fog or salt fog containing a high concentration of $SO_2$, corrosion of the least noble of the conductive surfaces will occur. Corrosion may lead to a degradation in the EMI/RFI shielding effectiveness of the seal. Mechanisms other than galvanic potentials, e.g. crevice corrosion, may also compromise the electrical and mechanical integrity of the enclosure.

Polysulfide polymers are known in the art. The production of polysulfide polymers is characterized by Fettes and Jorzak, Industrial Engineering Chemistry, November, 1950, on pages 2,217 to 2,223. The commercial use of polysulfide polymers in the manufacture of sealants for aerospace applications has long been known and commercially used. Polysulfide sealants have been used to seal aircraft exterior fuselage because of the high tensile strength, high tear strength, thermal resistance, and resistance to high ultraviolet light. Polysulfide sealants have been used to seal aircraft fuel tanks because of the resistance to fuel and adhesion upon exposure to fuel.

Polysulfide sealants are generally applied by extrusion using a gun. Extruding a sealant to seal apertures in airframe such as those associated with access doors or panels can require a significant amount of effort. The interior perimeter of the access door opening is masked and the exterior perimeter of the access door is coated with a release agent to avoid sealing an access door shut. The sealant is extruded and the access door is put in place and clamped down to force the excess sealant around the access door. The sealant is allowed to cure and the excess sealant is trimmed away. This process is time intensive and can add significant labor demands for servicing aircraft with many access doors. Some aircraft can have as many as a hundred or more access doors that are used to cover sensitive electronic equipment or fittings that must be periodically accessed.

Accordingly, it is desirable to provide compositions and methods for sealing access doors, for example those in an airframe of an aviation or aerospace vehicle, that are not as labor and time intensive as the conventional extrusion method for sealing the access doors. It is also desirable to provide such compositions and methods that further provide effective EMI/RFI shielding and cause minimal corrosion to conductive surfaces.

SUMMARY OF THE INVENTION

The present invention is directed to preformed compositions in shaped form, comprising a polymer blend that comprises at least one polysulfide component and at least one polythioether component.

The present invention is further directed to methods for sealing an aperture comprising: (a) covering the aperture with the preformed composition of the present invention in shaped form; and (b) curing the composition so as to seal the aperture.

DETAILED DESCRIPTION OF THE INVENTION

The present invention is directed to a preformed composition in shaped form comprising a polymer blend comprising at least one polysulfide component and at least one polythioether component. The term "preformed" refers to a composition that can be made into a particular shape for ease of packaging, storage, and/or application. A composition that is preformed can be reshaped into any shape, either intentionally, or as a result of shipping and/or handling. The term "shaped form" refers to a configuration such that the thickness of the preformed composition is substantially less than the lateral dimension and includes but is not limited to tapes, sheets and cut-out or gasket forms. The "shaped form" can be in the form of a tape meaning a narrow shape, strip, or band that can be stored as rolls, coils, or strips. The "shaped form" can also be die-cut to the dimensions of the aperture to be sealed.

"Sealant" and like terms refer to compositions that have the ability to resist atmospheric conditions such as moisture and/or temperature and/or at least partially block the transmission of materials such as water, fuel, and/or other liquids and gasses. Sealants often have adhesive properties, as well. "Aperture" refers to a hole, gap, slit or other opening. The term "elongated aperture" refers to such an opening in which the length is at least three-times the width. "Shielding" and like terms refer to the ability to divert, route, and/or reflect incident electromagnetic energy. Shielding effectiveness represents the ratio of the electromagnetic energy passing through a shield to the electromagnetic energy striking the shield.

The polymer blend of the present invention comprises at least one polysulfide component and at least one polythioether component. The "polysulfide component" of the present invention comprises a polysulfide polymer that contains multiple sulfur-sulfur linkages, i.e., —[S—S]—, in the polymer backbone and/or in the terminal or pendant positions on the polymer chain. Typically, the polysulfide polymers in the present invention will have two or more sulfur-sulfur linkages. Suitable polysulfides are commercially available from Akzo Nobel under the name THIOPLAST. THIOPLAST products are available in a wide range of molecular weights ranging, for example, from less than 1100 to over 8000, with molecular weight being the average molecular weight in grams per mole. Particularly suitable as a number average molecular weight of 1000 to 4000. The crosslink density of these products also varies, depending on the amount of crosslinking agent used. The "—SH" content, i.e. the mercaptan content, of these products can also vary. The mercaptan content and molecular weight of the polysulfide can affect the cure speed of the blend, with cure speed increasing with molecular weight.

In some embodiments, it is desired to use a combination of polysulfides to achieve the desired molecular weight and/or crosslink density in the polymer blend. Different molecular weights and/or crosslink densities can contribute different characteristics to the blend and compositions incorporating the blend. For example, blends wherein the polysulfide component comprises more than one polysulfide polymer and one of the polysulfide polymers has a molecular weight of approximately 1000 have desirable non-crystallization properties.

The second component in the polymer blend of the present invention is a polythioether. The "polythioether component" of the present invention is a polymer comprising at least one polythioether linkage, i.e., —[—CH$_2$—CH$_2$—S—CH$_2$—CH$_2$—]—. Typical polythioethers have from 8 to 200 of these linkages. Polythioethers suitable for use in the present invention include those described in U.S. Pat. No. 6,372,849. Suitable polythioethers typically have a number average molecular weight of 1000 to 10,000, such as 2,000 to 5,000, or 3,000 to 4,000. In some embodiments, the polythioether component will be terminated with non-reactive groups, such as alkyl, and in other embodiments will contain reactive groups in the terminal or pendant positions. Typical reactive groups are thiol, hydroxyl, amino, vinyl and epoxy. For a polythioether component that contains reactive functional groups, the average functionality typically ranges from 2.05 to 3.0, such as from 2.1 to 2.6. A specific average functionality can be achieved by suitable selection of reactive ingredients. Examples of suitable polythioethers are available from PRC-Desoto International, Inc., under the trademark PERMAPOL, such as PERMAPOL P-3.1E or PERMAPOL P-3. As with the polysulfide component, combinations of polythioethers can be used to prepare the polythioether component according to the present invention.

The polymer blends of the present invention can be prepared according to any standard means known in the art, such as by mixing the polysulfide component and polythioether component and blending in a standard mixer such as a cowls mixer or planetary mixer. The ratio of polysulfide component to polythioether component in the blend can range from 10:90 to 90:10. A 50:50 ratio is particularly suitable for some embodiments. The molecular weight of the present polymer blend is typically from 1000 to 8000, such as 3500 to 4500, as measured theoretically or using GPC. The Tg of the polymer blend is typically –70° C. or lower, such as –60° C. or lower. The viscosity of the blend will typically be lower than the viscosity of a polysulfide having a comparable molecular weight; this contributes to the ease of handling of the present compositions and may minimize if not eliminate the need for solvents.

The polymer blend in the present compositions typically comprises 10 to 50 weight percent, such as 20 to 30 weight percent, with weight percent based on the weight of the total preformed composition.

In certain embodiments, the preformed composition of the present invention further comprises a suitable curing agent. The term "curing agent" refers to any material that can be added to accelerate the curing or gelling of the polymer blend. In some embodiments, the curing agent is reactive at 10° C. to 80° C. The term "reactive" means capable of chemical reaction and includes any level of reaction from partial to complete reaction of a reactant. In certain embodiments, a curing agent is reactive when it provides for cross-linking or gelling of a sulfur-containing polymer. "Cure" refers to the point at which the composition achieves a cure hardness of 30 Durometer "A" as measured according to ASTM D2240.

In certain embodiments, the preformed composition comprises a curing agent that contains oxidizing agents that oxidize terminal mercaptan groups in the polymer blend. Useful curing agents include lead dioxide, manganese dioxide, calcium dioxide, sodium perborate monohydrate, calcium peroxide, zinc peroxide, dichromate and epoxy. Other suitable curing agents may contain reactive functional groups that are reactive with the functional groups in the polymer blend. Examples include but are not limited to polythiols, such as polythioethers; polyisocyanates such as isophorone diisocyanate, hexamethylene diisocyanate, and mixtures and isocyanurate derivatives thereof; and polyepoxides. Examples of polyepoxides include hydantoin diepoxide, Bisphenol-A epoxides, Bisphenol-F epoxides, Novolac-type epoxides, aliphatic polyepoxides, and epoxidized unsaturated and phenolic resins. The term "polyepoxide" refers to a material having a 1,2-epoxy equivalent greater than one and includes monomers, oligomers, and polymers. Cure accelerators or retardants can also be used, such as a dimethylene/thiuram/polysulfide mixture cure accelerator or a stearic acid cure retarder, which will retard the rate of cure thereby extending the "pot life" of the composition. To control the properties of the composition, one or more materials capable of at least partially removing moisture from the composition, such as molecular sieve powder.

The preformed compositions of the present invention can also comprise one or more additives. "Additives" refer to non-reactive components in the preformed composition that provides a desired property. Examples of additives include but are not limited to fillers, adhesion promoters, and plasticizers. Fillers useful in the present compositions, especially for aerospace applications, include those commonly used in the art, such as carbon black, calcium carbonate ($CaCO_3$), silica, nylon and the like. Potting compound fillers illustratively include high band gap materials such as zinc sulfide and inorganic barium compounds. In one embodiment, the compositions include about 10 to about 70 weight percent of the selected filler or combination of fillers, such as about 10 to 50 weight percent based upon the total weight of the composition. In one embodiment, a combination of mica and polyamide are used as the filler component.

Mica is a silicate characterized by basal cleavage that imparts flexibility to laminas. Micas include natural muscovite, phlogopite, and biotite, as well as synthetic fluorophlogopite and barium disilicic. Preparation of synthetic micas is described in Encyclopedia of Chemical Technology, Vol. 13, pp. 398-424, John Wiley & Sons (1967). Mica provides flexibility and pliability to the preformed composition and reduces the tack. Polyamide powder provides viscosity and reduces the tack of the preformed composition. Polyamide resins can be produced by the condensation reaction of dimerized fatty acids, such as dimerized linoleic acid, with lower aliphatic polyamines, such as for example, ethylene diamine or diethylene triamine, so that the final product has multiple amide groups in the resin backbone. A process for the manufacture of polyamide resins is disclosed in U.S. Pat. No. 2,450,940. Polyamide resins suitable for the preformed composition are solid at use temperature and typically have a number average molecular weight of at least 10,000 Daltons.

In certain embodiments, mica and polyamide together form 10 percent by weight to 50 percent by weight of the total weight of the preformed composition with substantially equal amounts of mica and polyamide. "Substantially equal" means that the amount of mica and the amount of polyamide are present in an amount of less than 5 percent of each other. The amount of mica can range from 5 percent by weight to 25 percent by weight and the amount of polyamide from 5 percent by weight to 25 percent by weight. In one embodiment, the amount of mica ranges from 10 percent by weight to 20 percent by weight and the amount of polyamide ranges from 10 percent by weight to 20 percent by weight of the total weight of the preformed composition.

One or more adhesion promoters can also be used. Suitable adhesion promoters include phenolics such as METHYLON phenolic resin available from Occidental Chemicals, organosilanes such as epoxy, mercapto or amino functional silanes such as A-187 and A-1100 available from Osi Specialties. An adhesion promoter can be used in an amount from 0.1 to 15 weight percent based upon total weight of the formulation.

A plasticizer can be used in the present compositions in an amount ranging from 1 to 8 weight percent based upon total weight of the formulation. Useful plasticizers include phthalate esters, chlorinated paraffins, hydrogenated terphenyls, etc.

The formulation can further comprise one or more organic solvents, such as isopropyl alcohol, in an amount ranging from 0 to 15 percent by weight on a basis of total weight of the formulation, such as less than 15 weight percent or less than 10 weight percent.

Compositions of the present invention can also optionally include other additives standard in the art, such as pigments; thixotropes; retardants; catalysts; and masking agents.

Useful pigments include those conventional in the art, such as carbon black and metal oxides. Pigments can be present in an amount from about 0.1 to about 10 weight percent based upon total weight of the formulation.

Thixotropes, for example fumed silica or carbon black, can be used in an amount from about 0.1 to about 5 weight percent based upon total weight of the formulation.

The curing agent will generally comprise 2 to 30 weight percent of the total composition such as 5 to 20 weight percent, with weight percent based on the total weight of the composition. In general, the equivalent ratio of curing agent to polymer blend may range from 0.5:1 to 2.0:1. A cure accelerator, if used, can be present in an amount ranging from 1 to 7 weight percent, a cure retarder, if used, in an amount ranging from 0.1 to 1 weight percent, and a moisture remover, if used, in an amount ranging from 0.1 to 1.5 weight percent, with weight percent based on the total weight of the curing agent composition.

When used, additives can comprise up to 50 weight percent of the total weight of the preformed composition.

In certain embodiments, the preformed compositions of the present invention are prepared as two pack or "2K" systems, in which the polymer blend is in one component, referred to herein as the base composition, and the curing agent is in the other component, referred to herein as the curing agent composition. The base composition and curing agent composition are mixed just prior to use.

The present invention is also directed to a preformed composition in shaped form comprising a polymer blend comprising at least one polyepoxide component and at least one polythioether component, and at least one electrically conductive filler. An "electrically conductive filler" is a filler that, when added to a formulation, imparts electrical conductivity and/or EMI and/or RFI shielding to the formulation. Examples of such fillers include electrically conductive noble metal-based fillers such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal-based materials can also be suitable including non-noble metal-plated non-noble metals such as copper-coated iron particles or nickel plated copper; non-noble metals, e.g., copper, aluminum, nickel, cobalt; and non-noble-metal-plated-non metals, e.g., nickel-plated graphite and non-metal materials such as carbon black and graphite. Combinations of the conductive fillers can also be used to meet the desired conductivity, EMI/RFI shielding effectiveness, hardness and other properties suitable for a particular application.

The shape and size of the electrically conductive fillers is not critical to preformed compositions of the invention. The fillers may be of any shape generally used in the manufacture of conductive materials, including spherical, flake, platelet, irregular or fibrous, such as milled or chopped fibers. In making preformed compositions in shaped form, in accordance with certain embodiments of the invention, the composition may comprise conductive fillers and radar absorbing materials having various shapes. For example, the shape of the conductive fillers may be spherical, substantially spherical, or irregular.

Carbon fibers, particularly graphitized carbon fibers, can be used to impart electrical conductivity to preformed compositions of the invention. Carbon fibers formed by vapor phase pyrolysis methods and graphitized by heat treatment and which are hollow or solid with a fiber diameter of from 0.1 micron to several microns have high electrical conductivity. As disclosed in U.S. Pat. No. 6,184,280, carbon microfibers, nanotubes or carbon fibrils having an outer diameter of less than 0.1 micron to tens of nanometers can be used as electrically conductive fillers. An example of graphitized carbon fiber suitable for conductive preformed compositions of the invention is PANEX 30MF, a 0.921 micron diameter round fiber having an electrical resistivity of 0.00055 Ω-centimeter (cm).

The average particle size of the electrically conductive fillers can be within the range normally used for fillers in conductive materials. In certain embodiments, the particle size of the one or more fillers is from about 0.25 microns to about 250 microns, and in other embodiments from about 0.25 microns to about 75 microns, and in still other embodiments from about 0.25 microns to about 60 microns. In certain embodiments, the preformed composition of the invention comprises Ketjen Black EC-600 JD (Akzo Nobel), a conductive carbon black characterized by an iodine absorption of 1000-11500 mg/g (J0/84-5 test method), and a pore volume of 480-510 $cm^3/100$ gm (DBP absorption, KTM 81-3504). In other embodiments, the carbon black filler is Black Pearls 2000 (Cabot Corporation).

In certain embodiments, electrically conductive polymers can be used to impart or modify the electrical conductivity of preformed compositions of the invention. Polymers having sulfur atoms incorporated into aromatic groups or adjacent to double bonds, such as in polyphenylene sulfide and polythiophene, are known to be electrically conductive. Other electrically conductive polymers include polypyrroles, polyaniline, poly(p-phenylene) vinylene, and polyacetylene. All of these can be used according to the present invention.

In certain embodiments, electrically conductive preformed compositions of the invention comprise electrically conductive materials ranging from 2 percent to 50 percent by weight of the total weight of the electrically conductive preformed composition.

Galvanic corrosion of dissimilar metal surfaces and the electrically conductive compositions of the invention can be minimized or prevented by adding corrosion inhibitors to the composition, and/or by selecting appropriate conductive fillers. Corrosion inhibitors include, for example, strontium chromate, calcium chromate, magnesium chromate, and combinations thereof, aromatic triazoles and a sacrificial oxygen scavenger such as Zn; other suitable corrosion inhibitors are known in the art. In certain embodiments, the corrosion inhibitor comprises less than 10 percent by weight of the total weight of the electrically conductive preformed composition. In other embodiments, the corrosion inhibitor comprises an amount ranging from 2 percent to 15 percent by weight of the total weight of the electrically conductive preformed composition. Corrosion between dissimilar metal surfaces can also be minimized or prevented by the selection of the type, amount, and properties of the conductive fillers comprising the preformed composition.

In certain embodiments, a base composition can be prepared by batch mixing at least one polysulfide, at least one polythioether, additives, and/or fillers in a double planetary mixer under vacuum. Other suitable mixing equipment includes a kneader extruder, sigma mixer, or double "A" arm mixer. For example, a base composition can be prepared by mixing at least one polysulfide, at least one polythioether polymer, plasticizer, and phenolic adhesion promoter. After the mixture is thoroughly blended, additional constituents can be separately added and mixed using a high shear grinding blade, such as a Cowls blade, until cut it. Examples of additional constituents that can be added to a base composition include corrosion inhibitors, non-conductive fillers, electrically conductive fiber, electrically conductive flake, and silane adhesion promoters. The mixture can then be mixed for an additional 15 to 20 minutes under a vacuum of 27 inches of mercury or greater to reduce or remove entrapped air and/or gases. The base composition can then be extruded from the mixer using a high-pressure piston ram.

The curing agent composition can be prepared by batch mixing the curing agent and other additives. In certain embodiments, 75 percent of the total plasticizer such as partially hydrogenated terphenyl and an accelerant such as a dipentamethylene/thiuram/polysulfide mixture are mixed in a single-shaft anchor mixer. Molecular sieve powder is then added and mixed for 2 to 3 minutes. Fifty percent of the total manganese dioxide is then mixed until cut in. Stearic acid, sodium stearate, and the remaining plasticizer are then mixed until cut in followed by the remaining 50 percent of the manganese dioxide which is mixed until cut in. Fumed silica is then mixed until cut in. If the mixture is too thick, a surfactant may be added to increase wetting. The curing agent composition is then mixed for 2 to 3 minutes, passed over a three-roll paint mill to achieve a grind, and returned to the single-shaft anchor mixer and mixed for an additional 5 to 10 minutes. The curing agent composition can then be removed from the mixer with a piston ram and placed into storage containers and aged for at least five days prior to combining with a base composition.

The base composition and curing agent composition are mixed together to form the preformed composition just prior to use. Any suitable means for mixing can be employed. For example, the base composition and curing agent composition can be combined in the desired ratio using meter mix equipment fitted with a dynamic mix head. Pressure from the meter mix equipment forces the base and curing agent compositions through the dynamic mix head and an extrusion die. In certain embodiments the preformed composition is extruded into a laminar form including a tape or sheet. The preformed composition in sheet form can be cut to any desired shape such as the shape defined by the dimensions of an aperture to be sealed. In certain embodiments, the shaped form can be coiled with release paper separating each ring for packaging purposes. The shaped form is then refrigerated by placing the shaped form on a bed of dry ice and placing another layer of dry ice on the top of the shaped form. The shaped form is refrigerated immediately after mixing the base composition and the curing agent composition. The shaped form remains exposed to the dry ice for 5 to 15 minutes and is then placed at a storage temperature of −40° C. or lower. The term "refrigerated" refers to reducing the temperature of the preformed composition so as to retard and/or stop the curing of the preformed composition. Typically, the preformed composition in shaped form is refrigerated below −40° C.

In certain embodiments, the temperature of the preformed composition is raised to a use temperature ranging from 40° C. to 32° C. (40° F. to 90° F.) prior to application. This is done such that the preformed composition reaches use temperature for no more than 10 minutes prior to application.

In certain embodiments the preformed composition in shaped form can be used to seal an aperture between a removable access panel and the surface adjacent to the perimeter of an opening in an aircraft fuselage. Adhesion promoter is first brushed on the perimeter of the access panel opening after the surface has been cleaned with a cleaning solvent such as DESOCLEAN. The surface of the access panel is then cleaned and coated with a release agent prior to applying the preformed composition. The preformed composition in shaped form is manually applied to the surface adjacent to the perimeter of the access panel opening, to the surface adjacent to the perimeter of the access panel, or to both. The access panel is then put in place and clamped down forcing the excess preformed composition around the edges of the access panel. Excess preformed composition is easily removed by using, for example, a flat surface. Excess preformed composition can be removed either prior to curing or after the preformed composition has cured, and preferably after the preformed composition cures.

The integrity, moisture resistance and fuel resistance of the seal resulting from application of preformed compositions of the present invention can be evaluated by performing the tests identified in specification MMS 332. An acceptable seal will be tight and resistant to moisture and aircraft fuel.

In addition to ease of handling and use, the present compositions may cause minimal corrosion to conductive surfaces in the environments encountered in aviation and aerospace applications. Because the present polymer blends have both a polysulfide and a polythioether component, they are compatible with other sealants or coating layers having one or the other of these technologies. They also exhibit good solvent resistance.

It is noted that, as used in this specification and the appended claims, the singular forms "a", "an", and, "the" include plural referents unless expressly and unequivocally limited to one referent. Thus, for example, reference to "a filler" includes one or more fillers. Also it is noted that, as used herein, the term "polymer" is meant to refer to prepolymers, polymers, oligomers, homopolymers, and copolymers.

For the purposes of this specification and appended claims, unless otherwise indicated, all numbers expressing quantities of ingredients or percentages or proportions of other materials, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "10 to 50" includes any and all sub-ranges between (and including) the minimum value of 10 and the maximum value of 50, that is, any and all sub-ranges having a minimum value of equal to or greater than 10 and a maximum value of equal to or less than 50, e.g., 25 to 50.

EXAMPLE

The following example is intended to illustrate the invention, and should not be construed as limiting the invention in any way.

Example 1

Example 1 provides an electrically conductive preformed composition in shaped form exhibiting EMI/RFI shielding effectiveness. The following materials were mixed in the proportions according to Table I to provide an electrically conductive base composition: PERMAPOL P 3.1 polythioether polymer from PRC-DeSoto International, Inc., THIOPLAST G4 polysulfide polymer from Akcros Chemicals (New Brunswick, N.J.), phenolic resin adhesion promoter from PRC-DeSoto International, Inc., and HB-40 modified polyphenyl plasticizer from Solutia, Inc. (St. Louis, Mo.). Using a high shear grinding blade (Cowls blade), the following materials were individually added and blended until cut in: calcium chromate corrosion inhibitor (Wayne Pigment Corp., Milwaukee, Wis.), hydrophobic fumed silica (R202, from Aerosil/Degussa, Diamond Bar, Calif.), Ni fiber (30 μm diameter, 500 μm length; from Intramicron, Birmingham, Ala.), Ni-coated graphite (I) (60% Ni-coated graphite; from Novamet, Wyckoff, N.J.), Ni-coated graphite (II) (60% Ni-coated graphite; from Sulzer Metco/Ambeon, Switzerland), mercapto silane adhesion promoter (Silane A189; GE Specialty Materials, Wilton, Conn.), and epoxy silane adhesion promoter (Silane A187; GE Specialty Materials, Wilton, Conn.).

TABLE I

| Material | Weight Percentage |
| --- | --- |
| PERMAPOL P 3.1 Polythioether Polymer | 11.92 |
| THIOPLAST G4 Polysulfide Polymer | 12.04 |
| Sulfur-containing phenolic resin | 0.63 |
| HB-40 Plasticizer | 1.14 |
| Calcium Chromate | 3.69 |
| Silica | 5.23 |
| Ni Fiber | 6.98 |
| Ni-coated Graphite (I) | 29.08 |
| Ni-coated Graphite (II) | 29.08 |
| Silane Adhesion Promoter (mercapto) | 0.10 |
| Silane Adhesion Promoter (epoxy) | 0.10 |

Separately, the following materials were mixed in the amounts according to Table II to form a curing agent composition: manganese dioxide from EaglePicher (Phoenix, Ariz.), partially hydrogenated terphenyl, stearic acid, fumed silica, sodium stearate from Witco Chemicals, molecular sieve powder to remove excess moisture from the curing agent, and dipentamethylene/thiuram/polysulfide mixture from Akrochem Corporation (Akron, Ohio) to accelerate the cure. The curing agent composition was allowed to set or age for at least five days before combining with the base composition.

TABLE II

| Material | Weight Percentage |
| --- | --- |
| Manganese Dioxide | 54.59 |
| Partially Hydrogenated Terphenyl | 35.92 |
| Stearic Acid | 0.60 |
| Fumed Silica | 2.00 |
| Sodium Stearate | 0.73 |
| Molecular Sieve Powder | 0.70 |
| Dipentamethylene/Thiuram/Polysulfide Mixture | 5.46 |

One hundred parts by weight of the electrically conductive base composition according to Table I, and 10 parts by weight of the curing agent composition of Table II were combined to prepare the electrically conductive preformed composition. After thorough mixing and degassing, the electrically conductive preformed composition thus formed was extruded into a tape form and refrigerated at −40° C.

The surface adjacent to the perimeter of an aircraft access panel was first coated with low VOC epoxy primer according to specification MMS-423 and cured. The surface was cleaned and then coated with adhesion promoters PR-148 or PR-184 from PRC-DeSoto International, Inc. The access panel was made from titanium alloy conforming to AMS-T-9046. After the refrigerated electrically conductive preformed composition equilibrated to use temperature, 4° C. to 32° C. (40° F. to 90° F.), the electrically conductive preformed composition in tape form was manually applied to the surface adjacent to the perimeter of the access panel. The access panel was put in place to cover the access opening and clamped down, forcing the excess electrically conductive preformed composition around the edges of the access panel to fill the aperture. Excess electrically conductive preformed composition was easily removed. After 3 to 4 hours at a temperature of 4° C. to 32° C. (40° F. to 90° F.), a tight seal, resistant to moisture and aircraft fuel, resulted.

The cured sealant exhibited a sheet resistance (four-point probe) of less than 0.50 $\Omega/cm^2$. Seals to apertures between an aluminum test fixture and a carbon/epoxy lid exhibited shielding effectiveness from 1 MHz to 200 MHz when tested in an anechoic chamber. Similarly sealed apertures also exhibited shielding effectiveness from 0.1 GHz to 18 GHz when tested in a stirred mode chamber.

Whereas particular embodiments of this invention have been described above for purposes of illustration, it will be evident to those skilled in the art that numerous variations of the details of the present invention may be made without departing from the invention as defined in the appended claims.

What is claimed is:

1. An electrically conductive preformed composition in shaped-form comprising:
    a) a polymer blend comprising:
        i) at least one polysulfide component,
        ii) at least one polythioether component; and
    b) at least one electrically conductive filler.

2. The electrically conductive preformed composition of claim 1, wherein the electrically conductive filler is present in an amount ranging from 2 percent to 50 percent by weight of the total weight of the electrically conductive preformed composition.

3. The electrically conductive preformed composition of claim 1, wherein the filler is selected from carbon, graphite, metal, and conductive polymer.

4. The electrically conductive preformed composition of claim 1, wherein the electrically conductive filler comprises at least carbon fiber and/or carbon black.

5. The electrically conductive preformed composition of claim 1, further comprising at least one corrosion inhibitor.

6. The electrically conductive preformed composition of claim 1, further comprising a curing agent for the polymer blend.

7. The electrically conductive preformed composition of claim 6, wherein the curing agent comprises an oxidizing agent.

8. The electrically conductive preformed composition of claim 7, wherein the curing agent comprises manganese dioxide.

9. The electrically conductive preformed composition of claim 6, wherein the curing agent is reactive at a temperature ranging from 10° C. to 80° C.

10. The electrically conductive preformed composition of claim 6, wherein the curing agent is present in an amount ranging from 5 percent by weight to 20 percent by weight of the total weight of the electrically conductive preformed composition.

11. The electrically conductive preformed composition of claim 1, wherein the electrically conductive preformed composition is curable at a temperature ranging from 10° C. to 30° C.

12. The electrically conductive preformed composition of claim 1, wherein the polymer blend is present in an amount ranging from 20 percent by weight to 50 percent by weight of the total weight of the electrically conductive preformed composition.

13. The electrically conductive preformed composition of claim 1, further comprising a plasticizer.

14. A method of sealing and/or shielding an aperture comprising:
   a) covering the aperture with the preformed composition of claim 1; and
   b) curing the composition so as to seal the aperture and/or provide shielding.

15. The method of claim 14, wherein the surface is a surface of a removable panel.

16. The method of claim 14, wherein the surface is a surface adjacent to an opening.

17. The method of claim 14, wherein the aperture is a space between the surface adjacent to an opening and a surface of a removable panel.

18. The method of claim 14, wherein the aperture is on an aviation or an aerospace vehicle.

19. The method of claim 14, wherein an adhesion promoter is applied to at least one surface defining the aperture prior to application of the electrically conductive preformed composition.

20. The method of claim 14, wherein a release agent is applied to a least one surface defining the aperture prior to application of the electrically conductive preformed composition.

* * * * *